US008175612B2

(12) United States Patent
Palmer et al.

(10) Patent No.: US 8,175,612 B2
(45) Date of Patent: May 8, 2012

(54) SYSTEM AND METHOD FOR MAP-BASED RADIO SPECTRUM ALLOCATION SEARCH

(75) Inventors: Michelle C. Palmer, Altamonte Springs, FL (US); Jeffrey C. Schmidt, Orlando, FL (US)

(73) Assignee: Anansi Networks, Inc., Lake Mary, FL (US)

( * ) Notice: Subject to any disclaimer, the term of this patent is extended or adjusted under 35 U.S.C. 154(b) by 509 days.

(21) Appl. No.: 12/256,645

(22) Filed: Oct. 23, 2008

(65) Prior Publication Data
US 2010/0105408 A1    Apr. 29, 2010

(51) Int. Cl.
*H04W 72/00* (2009.01)
(52) U.S. Cl. ........ 455/454; 455/423; 455/448; 455/450; 455/509; 370/329
(58) Field of Classification Search ............... 455/454
See application file for complete search history.

(56) References Cited

U.S. PATENT DOCUMENTS

| | | | |
|---|---|---|---|
| 5,608,727 | A | 3/1997 | Perreault et al. |
| 7,110,756 | B2 | 9/2006 | Diener |
| 2004/0087310 | A1 | 5/2004 | Williamson et al. |
| 2006/0031082 | A1 | 2/2006 | Amaitis et al. |
| 2006/0083205 | A1 | 4/2006 | Buddhikot et al. |
| 2006/0143111 | A1 | 6/2006 | Mylet |
| 2006/0218392 | A1 | 9/2006 | Johnston |
| 2007/0293170 | A1* | 12/2007 | Poston ............... 455/164.1 |
| 2008/0222021 | A1 | 9/2008 | Stanforth et al. |
| 2011/0032892 | A1* | 2/2011 | Bahl et al. ........... 370/329 |

OTHER PUBLICATIONS

Kwerel, Evan et al., "A Proposal for a Rapid Transition to Market Allocation of Spectum", Federal Communications Commission, 2002, OPP Working Paper No. 38, pp. 1-50.
By the Commission, "Second Report and Order, Order on Reconsideration, and Second Further Notice of Proposed Rulemaking", Federal Communications Commission, 2004, FCC 04-167, pp. 1-180.
McKnight, Lee et al., "Best Effort versus Spectrum Markets: Wideband and Wi-Fi versus 3G MVNOs?", pp. 1-18.
Prabhu, Krish et al., "Time for Action" Genuine Ideas, 2002, [retrieved online Feb. 1, 2008], <http://www.genuineideas.com/ArticlesIndex/TimeForAction.htm>.
International Search Report and Written Opinion for corresponding application No. PCT/US2009/059608 dated Nov. 25, 2009.

* cited by examiner

*Primary Examiner* — Charles Appiah
*Assistant Examiner* — Mazda Sabouri
(74) *Attorney, Agent, or Firm* — Renner, Otto, Boisselle & Sklar, LLP

(57) ABSTRACT

A map-based system displays a map of spectrum allocation information in a multi-dimensional representation. The system may provide a two-dimensional or three-dimensional area map of a geographic location of interest from an aerial perspective. In another dimension in the elevation direction, allocated spectrum segments may be stacked on the map to provide a representation of spectrum rights allocated in the selected geographical location. Time may provide an additional dimensional aspect to the map. A user may display the spectrum allocation map for a single instant in time, or view a dynamic map that displays the changing spectrum allocation over a time range. A user may also employ search criteria to filter the map display of spectrum allocation information by a specific frequency range, holder/licensee name, channel block, time window, lease or license expiration data, and other criteria.

21 Claims, 10 Drawing Sheets

80

| | |
|---|---|
| Geographic Category: | FCC Economic Area |
| Frequency Range(s): | 6-10 MHz; 2.4-2.6 GHz |
| Start Date/Time: | January 1, 2009/12:00:00 am EST |
| End Date/Time: | December 31, 2009/11:59:59 pm EST |
| Holder: | |
| Service Rules: | FCC Part 15 |
| Power Limit: | |

SYSTEM AND METHOD FOR MAP-BASED RADIO SPECTRUM ALLOCATION SEARCH

TECHNICAL FIELD OF THE INVENTION

The technology of the present disclosure relates generally to spectrum management and, more particularly, to a system and method for a map-based radio spectrum allocation search.

BACKGROUND

The telecommunications industry is in the midst of change due to the rapidly improving cost and performance capability of network components. Early telecommunications systems were highly centralized and provided simple services. Today, telecommunications networks (the Internet being an example) are highly distributed, flexible, and provide a variety of services.

Wireless communications continue to gain in popularity, but wireless communications are constrained due to a lack of available, interference free spectrum that may be used for reliable communications within a geographic area. To enhance the availability and reliability of interference free spectrum, systems have been developed regionally for allocating spectrum use.

In the U.S., for example, the Federal Communications Commission (FCC) licenses spectrum in a primary spectrum market to commission licensees. As an example of current spectrum allocation, FIG. 1 shows a portion of the current U.S. frequency allocations at 2.5 GHz. As can be seen in FIG. 1, plural bands of various frequency ranges have been established, and each of these may be allocated to a corresponding commission licensee or reserved for government use. It is noted that regulations specify that stations operating in the 2568-2572 MHz range and the 2614-2618 MHz range are secondary to adjacent channel operations, may not cause interference, and must accept interference from other stations. A secondary market exists for the commission licensees to sub-lease spectrum for use by other parties.

The public has informational access to the current allocation of spectrum through a network of FCC maintained databases of how spectrum rights have been allocated by the FCC in the primary market. The FCC databases, however, permit essentially a text-based search of spectrum allocation. A text search of the FCC databases, however, has proven inefficient and cumbersome for providing holders and users with specific spectrum allocation information.

SUMMARY

The present disclosure describes an enhanced system and methods for providing information regarding FCC spectrum allocation in a useful and convenient manner where a map-based search of radio spectrum allocation may be made. The disclosed system and methods identify, categorize, organize, and display information regarding wireless spectrum allocation in a searchable and printable knowledge base accessible over the Internet or comparable network. The system and methods, therefore, provide for both a comprehensive and comprehensible representation of FCC spectrum allocation information.

The disclosed system and methods permit a user to select a point or area on a map, about which a computer system queries an underlying data engine to produce a listing of FCC spectrum holders and licensees for the selected area. At a broad level, FCC spectrum holders and licensees may be listed for the selected area by frequency and channel plan. Spectrum users and prospective users may also filter the FCC information by a specific frequency range, holder/licensee name, channel block, lease or license expiration data, and other criteria. Multiple filter criteria may be combined for a more targeted search.

In one embodiment, users may navigate the FCC databases in a multi-dimensional map-based system. The system may provide a two-dimensional or three dimensional area map of a geographic location of interest from an aerial perspective. In a dimension in the elevation direction, segments or blocks of spectrum usage or availability may be stacked on the map to provide a representation of spectrum rights allocation in the selected geographical location. Time may provide another dimensional aspect to the map. A user may display the spectrum allocation map for a single instant in time, or view a dynamic map that displays the changing spectrum allocation over a time range. The map-based system may include additional features to enhance the display of the spectrum allocation. For example, a zoom feature may permit a user to focus on a specific area of interest within a broader geographic area. Color or pattern coding may be used to distinguish between frequency bands and/or other time, frequency, and geographic boundaries of the various FCC allocation boundaries. Color codes or other indicia may distinguish spectrum allocation by holder identity. It will be appreciated that the potential variations of map features are myriad and may be customizable to suit a particular users' preferences.

Therefore, according to one aspect of the invention, a method of displaying spectrum allocation in a map-based format comprises the steps of receiving user search criteria for spectrum allocation, the search criteria including a geographic area. The method further comprises accessing a database of spectrum allocation information, and transforming spectrum allocation information corresponding to the geographic area from the search criteria into display data for overlaying on a geographic map.

According to one embodiment of the method, the geographic map has a base representing a geography of the geographic area from the search criteria, and the spectrum allocation information is overlaid on the geography map base as spectrum segments according to frequency of corresponding allocated spectrum in an elevation direction relative to the geography map base.

According to one embodiment of the method, each spectrum segment has a color or pattern representing a corresponding frequency range.

According to one embodiment of the method, each spectrum segment has a color or pattern representing an entity having rights with respect to the associated spectrum.

According to one embodiment of the method, the spectrum segments are overlaid on the geography map base for a corresponding point in time.

According to one embodiment of the method, the overlaid spectrum segments are revised for a second point in time.

According to one embodiment of the method, the spectrum segments are overlaid on the geography map base dynamically over a time range to reflect changes in spectrum allocation over the time range.

According to one embodiment of the method, the spectrum segments are overlaid on the geography map as stacks of blocks.

According to one embodiment of the method, the method further comprises the steps of receiving a user input selection of a spectrum segment, and generating display data for the selected spectrum segment, the display data including information selected from spectrum holder information, secondary licensee information, spectral mask data, time window information, use restriction information and combinations thereof.

According to one embodiment of the method, the search criteria includes at least one of time, time range, frequency, frequency range, spectrum holder, or usage restrictions.

According to another aspect of the invention, a system for generating a display of spectrum allocation in a map-based format comprises an input interface for receiving user search criteria for spectrum allocation, the search criteria including a geographic area. The system further comprises a controller configured to access a database of spectrum allocation information and transform spectrum allocation information corresponding to the geographic area from the search criteria into display data for overlaying on a geographic map.

According to one embodiment of the system, the geographic map has a base representing a geography of the geographic area from the search criteria, and the spectrum allocation information is transformed into display data as spectrum segments according to frequency of corresponding allocated spectrum in an elevation direction relative to the geography map base.

According to one embodiment of the system, each spectrum segment has a color or pattern representing a corresponding frequency range.

According to one embodiment of the system, each spectrum segment has a color or pattern representing an entity having rights with respect to the associated spectrum.

According to one embodiment of the system, the spectrum segments are overlaid on the geography map base for a corresponding point in time.

According to one embodiment of the system, the overlaid spectrum segments are revised for a second point in time.

According to one embodiment of the system, the spectrum segments are overlaid on the geography map base dynamically over a time range to reflect changes in spectrum allocation over the time range.

According to one embodiment of the system, the spectrum segments are overlaid on the geography map as stacks of blocks.

According to one embodiment of the system, the controller is further configured to receive a user input selection of a spectrum segment, and to generate display data for the selected spectrum segment, the display data including information selected from spectrum holder information, secondary licensee information, spectral mask data, time window information, use restriction information and combinations thereof.

According to one embodiment of the system, the controller is located in a server device and the geographic map is displayed on a client device.

According to one embodiment of the system, the search criteria includes at least one of time, time range, frequency, frequency range, spectrum holder, or usage restrictions.

According to another aspect of the invention, a program is provided for displaying spectrum allocation in a map-based format, the program stored on a computer readable medium. The program comprises executable logic to receive user search criteria for spectrum allocation, the search criteria including a geographic area, access a database of spectrum allocation information, and transform spectrum allocation information corresponding to the geographic area from the search criteria into display data for overlaying on a geographic map.

According to one embodiment of the program, the geographic map has a base representing a geography of the geographic area from the search criteria, and the spectrum allocation information is overlaid on the geography map base as spectrum segments according to frequency of corresponding allocated spectrum in an elevation direction relative to the geography map base.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 12 depicts an exemplary user interface constituting a query page for entering spectrum allocation search criteria.

DETAILED DESCRIPTION OF EMBODIMENTS

Figure 1:
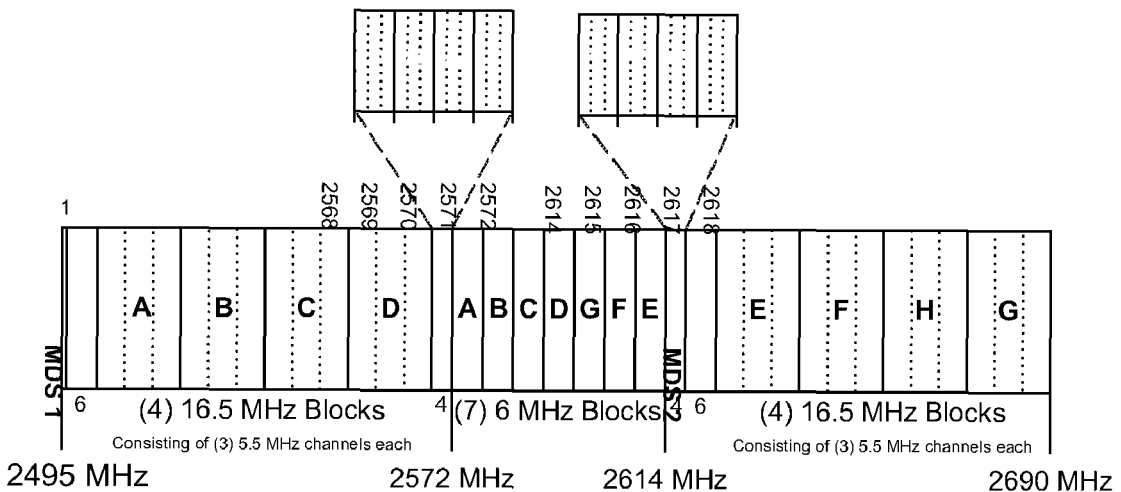
FIG. 1 is a schematic representation of U.S. spectrum allocations at around 2.5 GHz.

Embodiments will now be described with reference to the drawings, wherein like reference numerals are used to refer to like elements throughout. It will be understood that the figures are not necessarily to scale. Before describing the details of an exemplary map-based system for performing a radio spectrum allocation search, common terms are explained.

Explanation of Common Terms

In this document, described are various entities that have a relationship to electromagnetic spectrum for use in wireless communications. One entity is a spectrum holder, or simply a holder. A holder is any entity having the authority to release spectrum use to another entity by granting the other entity access to the spectrum. As will be described, the granting of access may be a temporary permission to use spectrum that is associated with the holder. Therefore, the access grant need not be a lease or a sub-lease, as defined by the FCC. The holder may be, but is not limited to, an entity licensed by the FCC (e.g., in the United States, an entity that has licensed spectrum directly from the FCC in the primary spectrum market), or a secondary market licensee that, for example, has subleased spectrum from a primary licensee.

Another entity is a spectrum user, or simply a user. A user is any entity or wireless communications system that has a need for spectrum in order to carry out wireless communications. The user also may be a holder.

Each segment of spectrum for which access permission may be transferred may be identified by several components, and each component is defined by one or more variables. Exemplary components include a time window, a frequency-based spectral mask, a geographic area, and a transmitted power limit. The time window may be a period of time that has a starting point given by a day and time and an ending point given by a day and time. Alternatively, the time window may be a period of time specified by a starting time and duration. The time window may be as short as seconds and as long as years.

The frequency-based spectral mask, as is known in the art, may be a mathematically defined set of lines applied to levels of radio transmission. The frequency-based spectral mask is generally intended to reduce interference by limiting excessive radiation at frequencies beyond a certain bandwidth. Spectral masks often include a center frequency and/or a frequency range. Also, spectral masks often include an absolute power component or a relative power component. For an absolute power component, the frequency-based spectral mask may specify that transmission beyond a specified frequency range must be below a specified power value. For a relative power component, the frequency-based spectral mask may specify that transmission beyond a specified frequency range must be below a relative power value as determined by a function, such as a specified power value below the total amount of power being transmitted.

The geographic area may include a defined geographical boundary that radios operating within the boundary may not appreciably transmit beyond. The geographical boundary may be a complex construct that relates to a contiguous or non-contiguous area. The amount of permissible transmission beyond the geographical boundary may be determined in an absolute manner or a relative manner. For an absolute manner, the geographic area may specify that transmission beyond the boundary must be below a specified power value. For a relative manner, the geographic area may specify that transmission beyond the boundary must be below a relative power value as determined by a function, such as a specified power value below the total amount of power being transmitted. In one embodiment, the function used for calculating the relative power value may include a distance parameter so that the relative power value may be calculated as a function of distance away from the boundary or other geographical reference.

The geographic area, alone or in combination with the time window, the frequency-based spectral mask and the transmitted power limit, may be established to control an amount of interference that a user system generates with respect to continued operations of the spectrum holder and/or other users.

The transmitted power limit may be a power value that radios operating in accordance with the transmitted power limit may not exceed. The transmitted power limit may be absolute or relative. The transmitted power limit may be independent of the frequency-based spectral mask and/or the geographic area. The transmitted power limit may be expressed as an average power value (e.g., average total power), a peak power value, or similar value. Exemplary transmitted power limits are 500 milliwatts (mW), one watt (W), 1,000 watts, etc.

Figure 2:
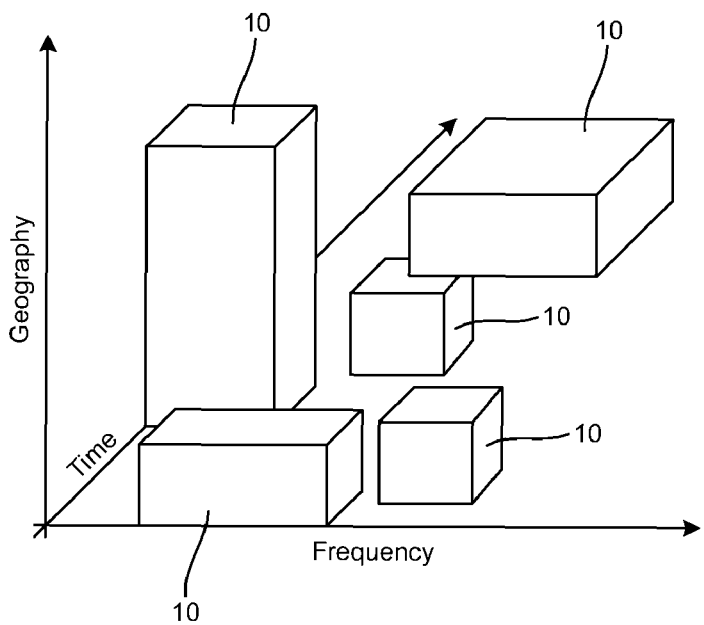
FIG. 2 is a schematic graph of disaggregated blocks of spectrum use rights that may be transferred from a corresponding spectrum holder to a spectrum user.

With additional reference to FIG. 2, the components that identify a block of spectrum (e.g., the time window, the frequency-based spectral mask, the geographic area, and/or the transmitted power limit) may combine to form a spectrum commodity item 10. The graph of FIG. 2 schematically illustrates disaggregated blocks of spectrum in three dimensions, including time, space (or geography) and frequency which may be respectively specified with more particularity by the time window, the geography-based emission mask and the frequency-based spectral mask. Each spectrum commodity item 10 may be associated with use rights that may be transferred from a corresponding spectrum holder to a spectrum user. The spectrum commodity item may have an associated monetary or non-monetary value, or may not be associated with a value.

Spectrum users are often interested in obtaining access to spectrum for a particular application, such as enterprise applications, two-way communications, point-to-point microwave transmissions, point-to-multipoint communications, cellular communications, mobile broadband communications, and so forth. It will be appreciated that this list is in no way exhaustive of the possible communication applications of potential users. Historically, spectrum users have gained spectrum access for their application(s) by obtaining a license or a secondary market license for spectrum that supports the desired application. In this historical sense, the spectrum associated with the license is defined by a geographical area, a spectral mask, a frequency (or set of frequencies) and one or more service rules. In the U.S., service rules are typically specified under an FCC "Part" number. The service rules under each license refer to an application and/or the type of radio technology that may use the licensed spectrum. While the service rules are typically commensurate with the user's desired application, the licensed spectrum effectively is limited for a stated purpose, although several types of uses may fall within the purpose as governed by the service rules associated with the license.

In some situations, a user may be interested in a targeted transfer of spectrum use rights, rather than a wholesale transfer of a spectrum holder's spectrum as found in conventional secondary market leases in which an entire monolithic block of spectrum is transferred. In these situations, the user may seek access to one or more portions of a holder's rights. For example, a user may desire access to spectrum limited by a variety of criteria, such as frequency band, geographic area, and time. For example, a user that seeks to provide broadband services to a specific location may desire 2.5 MHz of bandwidth in two adjacent zip codes, beginning on a predetermined date. It will be appreciated that other users may desire spectrum rights in accordance with different criteria.

Exemplary Map-Based Search System

The following describes a map-based system for searching spectrum allocation and holder information. The system is described primarily with respect to spectrum allocation information pertaining to FCC spectrum allocation. It will be appreciated, however, that the system may be used to search spectrum allocation information relating to spectrum allocation by regulatory agencies other than the FCC, including non-United States national or regional regulatory agencies. The system may be employed by a user with any suitable electronic device having a display and an input interface. Examples of suitable electronic devices may include a desktop or laptop computer, a mobile telephone, a personal digital assistant (PDA), a smartphone, and any other appropriate computing or communications device.

Figure 3:
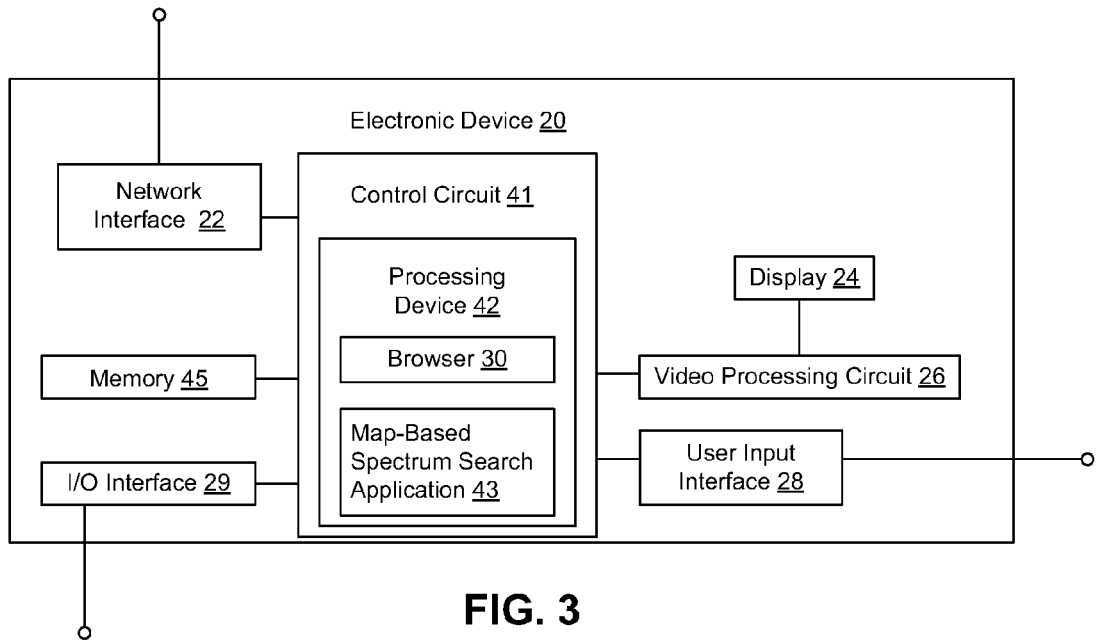
FIG. 3 is a schematic diagram depicting operative portions of an exemplary electronic device for use with the disclosed search system.

FIG. 3 represents a functional block diagram of operative portions of an electronic device 20 for executing the described search system. The electronic device 20 may include a map-based spectrum search application 43 for carrying out the features of the invention. Application 43 may be embodied as executable program code that is resident in and executed by the electronic device 20. The electronic device 20 may include a controller that executes the program code stored on a computer or machine-readable medium. The controller may include a control circuit 41 and/or a processing device 42. Application 43 may be a stand-alone software application or form a part of a software application that carries out additional tasks related to the electronic device 20. It will be apparent to a person having ordinary skill in the art of computer programming how to program an electronic device to operate and carry out logical functions associated with application 43. Accordingly, details as to specific programming code have been left out for the sake of brevity. Also, while the code may be executed by control circuit 41 in accordance with an exemplary embodiment, such controller functionality could also be carried out via dedicated hardware, firmware, software, or combinations thereof, without departing from the scope of the invention. Also, through the following description, exemplary techniques for implementing a map-based spectrum allocation search and display system and method are described. It will be appreciated that through the description of the exemplary techniques, a description of steps that may be carried out in part by executing software is described. The described steps are the foundation from which a programmer of ordinary skill in the art may write code to implement the described functionality. As such, a computer program listing is omitted for the sake of brevity. However, the described steps, when implemented in software and executed by a processor or control assembly, describe the structure of an apparatus.

The electronic device 20 may include a browser 30, such as a web browser for accessing content over the Internet or comparable external network. The browser may be a stand-alone function, or may be incorporated into another device function or controller as shown in FIG. 3. The browser may be associated with a network interface 22 for connecting to an external network. The network interface may be any wired or wireless network connection as are known in the art.

The electronic device 20 may include a display 24 for displaying information to a user. The display 24 may be coupled to the control circuit 41 by a video processing circuit 26 that converts video data to a video signal used to drive the display. The video processing circuit 26 may include any appropriate buffers, decoders, video data processors and so forth.

The electronic device 20 may include a user input interface 28 that permits a user to enter a variety of text, data, control, and other inputs. The user input interface may include one or more input devices, examples of which may include a keyboard, keypad, soft keys, mouse, pointer, stylus, and similar input instruments, and combinations thereof. In conjunction with one or more of these user input devices, the display 24 may include a touch screen surface for receiving inputs from a user directly onto the display.

The electronic device 20 may include an I/O interface 29 that permits connection to a variety of conventional I/O devices. Such devices may include equipment for transmitting or manipulating content obtained by electronic device 20, such as printers, faxes, scanners, and the like.

Although the various components of the electronic device 20 are depicted in FIG. 3 as being integrated into a single device, other component configurations may be employed. For example, in a laptop computer, the various components may be integrated into a single physical device, as depicted in FIG. 3. Alternatively, the various components may be segregated into separate physical devices. For example, electronic device 20 may be a desktop computer in which the display and one or more user input interfaces are physically separate from the other components. As further described below, the search features embodied in application 43 may be contained on a network server that is accessible by one or more client devices over the network. In this embodiment, the user input interface and the display would be components of the client devices, with program application 43 being accessed from and executed by the network server. Other component configurations may be employed as well.

The disclosed system and methods provide a map-based system for searching and obtaining spectrum allocation information. As a map-based system, a user may employ the electronic device 20 to access a map for display on the display 24. A user may then use the input interface 28 to select a point or area on the displayed map, about which a computer system queries an underlying data engine to produce a listing of FCC spectrum holders, licensees, and/or other spectrum allocation information for the selected area.

Figure 4:
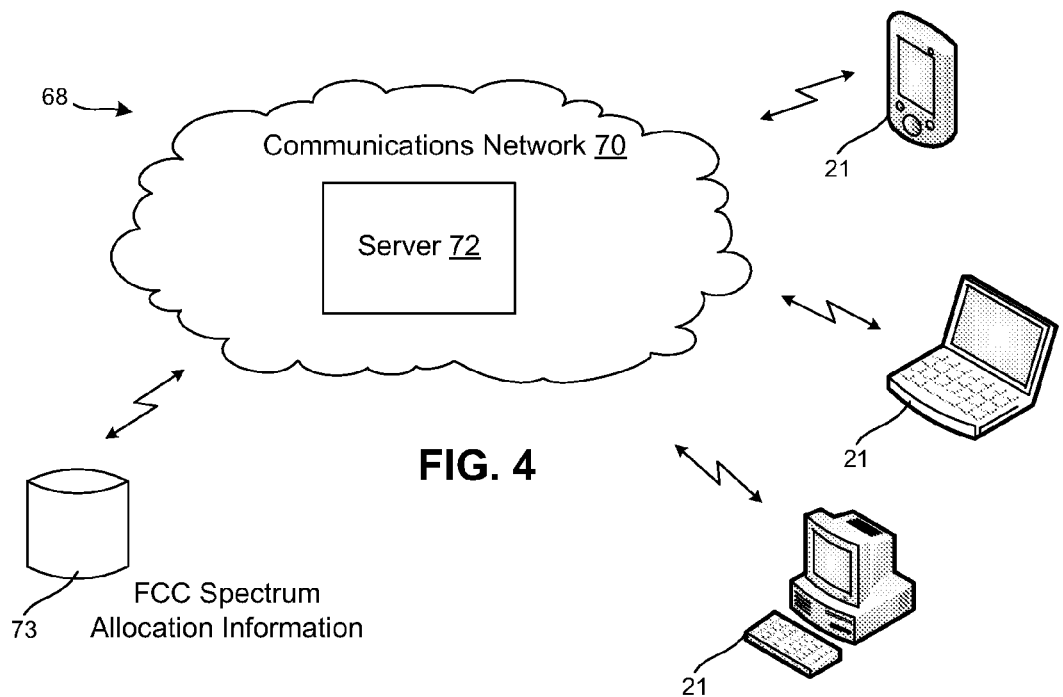
FIG. 4 is a schematic diagram depicting an exemplary communications system for providing the disclosed search system.

Conventionally, the FCC spectrum allocation information is contained in a network of databases accessible over the Internet or comparable network. The FCC maintains its own databases, although other private or government organizations may compile comparable information into a database. FIG. 4 depicts several electronic devices that comprise client devices 21 operating as part of a communications system 68. The system 68 may include a communications network 70 having a server 72 (or servers) for managing communications among the participants in the system. The server 72 communicates with participating electronic devices via a transmission medium. The transmission medium may be any appropriate device or assembly, for establishing a wired or wireless connection between the network and one or more client device 21. The transmission medium may include, for example, a communications tower (e.g., a cell tower), a wireless access point, a satellite, etc. Portions of the network may include wireless transmission pathways. As will be appreciated, the server 72 may be configured as a typical computer system used to carry out server functions and may include a processor configured to execute software containing logical instructions that embody the functions of the server 72 and a memory to store such software.

In one embodiment, the server 72 may include the application and control portions of electronic device 20 to host the map-based spectrum search application 43 for access by the client devices 21. For instance, the map-based spectrum search application 43 may have a front-end interface that may be accessed by client devices 21 using conventional Internet browsing functionality.

The communications system 68 may include a database 73 containing FCC spectrum allocation information. As stated above, the database 73 may be maintained by the FCC or some other third party, and although it is represented as a single database for simplicity in the figure, it will be appreciated the database 73 may comprise a network of separate databases containing the FCC spectrum allocation information.

As further described below, the system of the current disclosure provides a multi-dimensional representation of FCC spectrum allocation information, which may include a geographical map in two or three dimensions, spectrum allocation displayed on the map in an elevation dimension, and time as another dimension. Spectrum users and prospective users may also filter the FCC information by a specific frequency range, holder/licensee name, channel block, lease or license expiration date, time window and/or other criteria. Multiple filter criteria may be combined for a more targeted search. The described system thus provides a map-based system for searching and accessing FCC spectrum allocation information that displays spectrum allocation information for a particular geographic emission mask or area of interest.

One who seeks spectrum allocation information may begin by defining or selecting a specific geographic area of interest. Use of the map-based system of the present disclosure is described in the context of an example in which a prospective spectrum user seeks FCC spectrum allocation and holder information. For example, a prospective spectrum user may desire to deploy a wireless communications system that services a particular area, and therefore may wish to know the FCC spectrum allocation for that area. It will be appreciated that the disclosed system and methods may be used by spectrum holders and licensees, other spectrum users or prospective users, or anyone else who may desire FCC spectrum allocation information.

Figure 5:
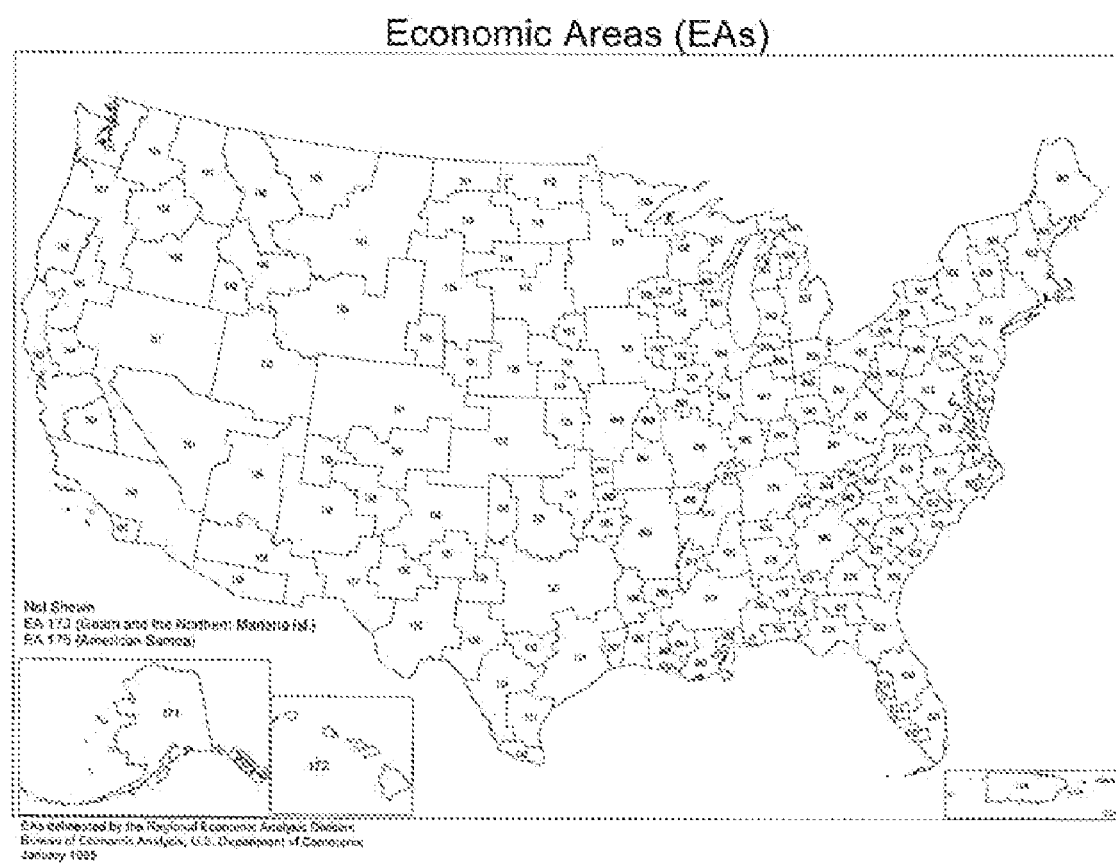
FIG. 5 depicts an exemplary rendition of the FCC Economic Area (EA) map.

A geographic area of interest may be defined in a variety of ways. For example, the FCC has established multiple, and sometimes overlapping, categories for dividing the United States into areas or regions for the purpose of assigning area-based spectrum licenses referred to herein as "FCC defined areas". For example, the FCC has divided the United States into 51 Major Trading Areas (MTAs), which are further subdivided into approximately 500 basic trading areas (BTAs). Other FCC geographic categories include Cellular Market Areas, Economic Area Groupings, and others. As an example, FIG. 5 depicts the FCC Economic Area (EA) map, which divides the United States and its territories into approximately 175 distinct economic area regions. Any such area, therefore, may also provide a starting point for a user to initiate a map-based search in the disclosed system.

It will be appreciated, however, that a map-based search need not be initiated based upon areas or regions defined by the FCC. More conventional geographic definitions may be used, including such areas as postal zip code, county, city, state (or portions of any thereof), latitude/longitude coordinates, world geodetic system (WGS) coordinates, or any others as may be convenient for a user.

It will also be appreciated that the geographic area of interest may be arbitrary with respect to the geographic boundaries associated with the spectrum. In other words, a geographic area of interest does not necessarily have to correspond with a radio spectrum boundary (although the geographic area of interest may do so). For example, if a county were to be defined as the geographic area of interest, the geographic scope of a particular radio spectrum may completely cover the county, encompass parts of other counties outside the county of interest, cover only a part of the county, none of the county, and the like. Accordingly, a user may have a variety of options for selecting a geographic area to be the basis for initiating a map-based search of spectrum allocation.

Figure 6:
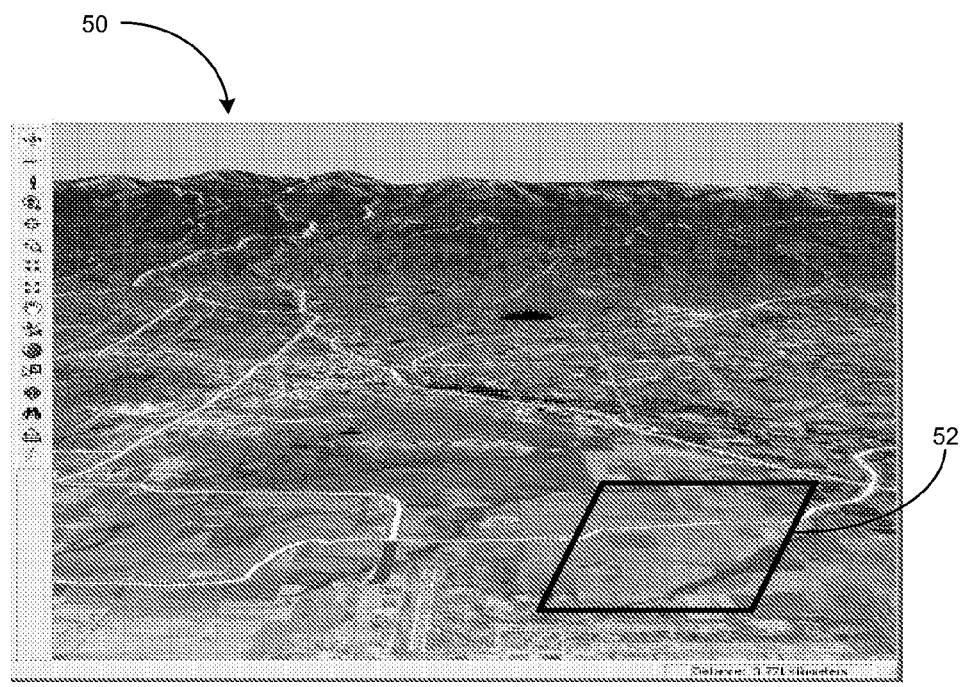
FIG. 6 is a map representation of an exemplary geographic area of interest in which spectrum may be allocated.

FIG. 6 depicts a map of an exemplary geographic area of interest 50 for the prospective spectrum user of this example. The area 50 may be or may include an FCC defined area or a user defined area. In this figure, the geographic region of interest is displayed as essentially a two-dimensional map. Note that the map, although referred to herein as essentially two-dimensional, may be tilted or have topographical features to provide a three-dimensional appearance. As further described below, the geographic map may provide a map base on which spectrum allocation information may be overlaid. The map may be displayed on the display 24 of the electronic device 20. The geographic area may be sub-divided into more specific areas of interest regarding particular spectrum allocation. For the purposes of this example, an exemplary more specific area of interest is denoted by a displayed polygon shape and will be referred to as area 52. The area 52 may be user defined by drawing on the map with a tool to outline an area, by entering coordinates, or by entering any other location-defining data. Alternatively, the area 52 may be an FCC defined area.

Figure 7:
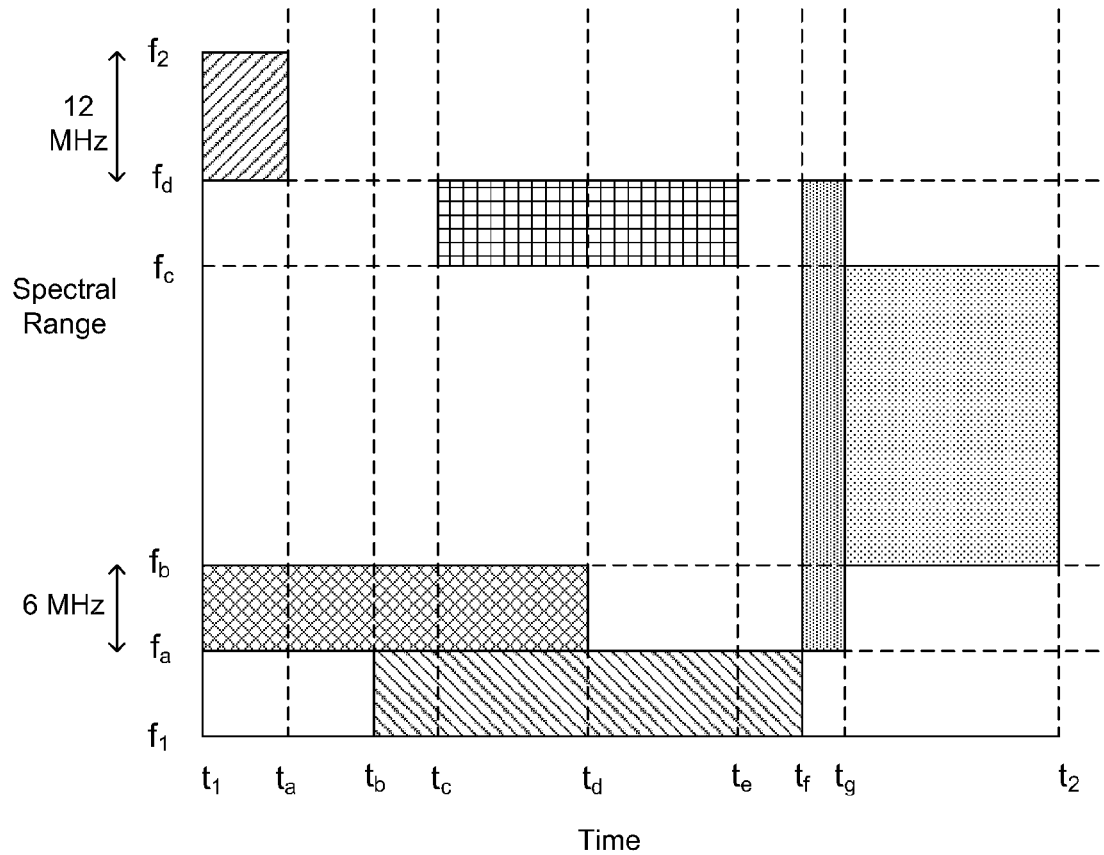
FIG. 7 depicts an exemplary allocation of spectrum for a portion of the geographic area of FIG. 6.

The mapping tool allows a user to select an area (e.g., area 50, or area 52 which is a portion of the area 50) for which spectrum allocation information is desired. The information may relate to spectrum that is held by on holder or spectrum that is held by multiple holders. In one embodiment, visual indications of spectrum allocation may be displayed in conjunction with boundary information and/or visual indicators of the boundary for the area 50 and/or area 52, where the boundary is determined as a function of an FCC defined area and/or a user defined area. FIG. 7 depicts an exemplary allocation of spectrum for area 52. In this example, the frequency allocation is shown for a spectrum range of $f_1 \rightarrow f_2$ for a time window or period of $t_1 \rightarrow t_2$. Note that $t_1$ may be the current time, or it may be some designated time in the future at which a user may desire spectrum rights (or otherwise desire spectrum allocation information). Time $t_1$ and/or $t_2$ may also be in the past should a user desire historical spectrum allocation information. In addition, the frequencies $f_1$ and $f_2$ may define any frequency range about which a user may desire spectrum allocation information.

It can be seen from FIG. 7 that at time $t_1$, a spectral mask having a frequency range of 6 MHz from $f_a \rightarrow f_b$ has been allocated, as well as a spectral mask having a frequency range of 12 MHz from $f_d \rightarrow f_2$. The 6 MHz spectral mask has been allocated for a time window from time $t_1 \rightarrow t_d$, and the 12 MHz spectral mask has been allocated for a time window from time $t_1 \rightarrow t_a$. As time proceeds from $t_1 \rightarrow t_2$, the spectrum allocation changes with differing spectral masks becoming allocated and unallocated during the time period. For example, at time $t_c$, three spectral masks are allocated, having frequency ranges $f_1 \rightarrow f_a$, $f_a \rightarrow f_b$, and $f_c \rightarrow f_d$, respectively. The 12 MHz spectral mask is no longer allocated, its allocation having expired at time $t_a$.

The information relating to the area(s) of interest 50, any specific area(s) 52, and the allocation of spectrum (e.g., as depicted in FIGS. 6 and 7) may be combined into a multi-dimensional representation of the allocation of spectrum information for the geographic area of interest 50 with a map base of area 50 for the display of spectrum allocation information. Spectrum allocation information conventionally is maintained as text-based data. In the disclosed system and methods, the spectrum allocation information is transformed from its text-based or native format into readable display data that may be overlaid in an elevation direction on the map base, for example, in the form of spectrum segments arranged according to frequency.

Figure 8:
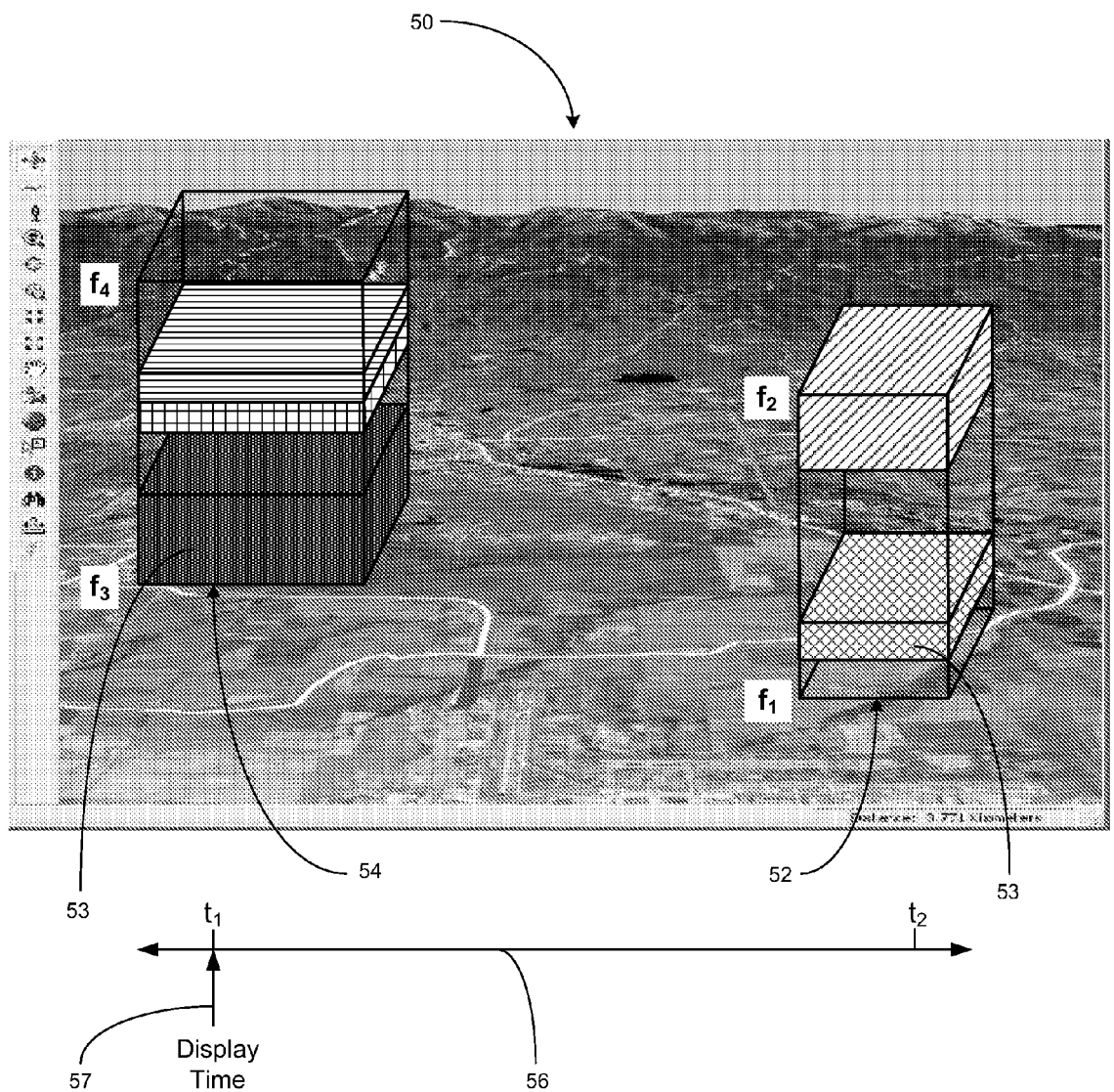
FIG. 8 depicts a map of spectrum allocation for the geographic area of FIG. 6 at a first given time.

For example, FIG. 8 depicts a snapshot of the allocation of spectrum information from FIG. 7 at time $t_1$. The map of FIG. 8 may be displayed on the display 24 of an electronic device 20 or client device 21. As shown in FIG. 8, the allocated spectrum for the specific area 52 is depicted on the map as a plurality of stacked spectrum segments 53 in the "elevation dimension". Although depicted as blocks, the precise look of the display of spectrum segments 53 may be varied (e.g., the blocks need not be rectangular solid in form). Geographical coverage of the allocated spectrum is represented relative to the actual area map, and time is static. Continuing with the example presented in FIG. 7, the gaps in the stack of spectrum segments 53 correspond to spectrum that is not allocated at time $t_1$, while the patterned blocks correspond to the 6 MHz and 12 MHz spectral masks depicted in FIG. 7.

The geographic area 50 may include additional specific areas of spectrum allocation, such as, for example, a second specific area of interest 54. Area 54 has its own stacked spectrum segments 53 depicting the corresponding segments of allocated and non-allocated spectrum in that area, which may differ from the allocation of area 52. Note that the allocation displays of areas 52 and 54 need not correspond to the same frequency ranges. For example, for area 54 the spectrum allocation is depicted for a frequency range $f_3 \rightarrow f_4$ rather than $f_1 \rightarrow f_2$. It will be appreciated that FIG. 8 depicts an example of a map-based depiction of spectrum allocation. There may be any number of areas depicted within the map, each having varying spectrum segments that may depict the FCC spectrum allocation for each corresponding area, or spectrum allocation over the entire map area may be displayed.

Figure 9:
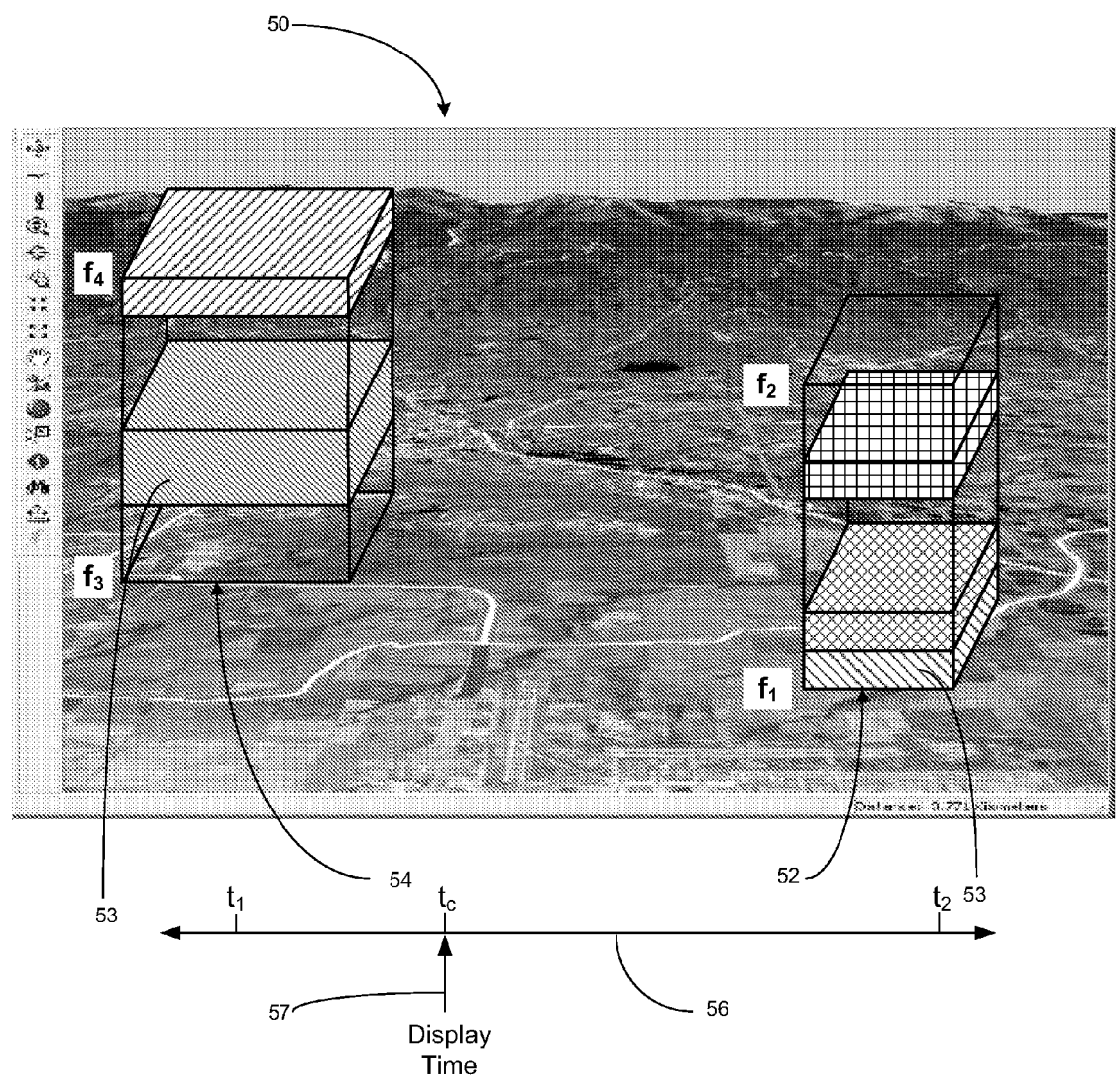
FIG. 9 depicts a map of spectrum allocation for the geographic area of FIG. 6 at a second given time.

Time may act as another dimension of the spectrum allocation display. For example, FIG. 8 includes a graphical user interface (GUI) feature in the form of a time line 56. The user may manipulate an indication arrow 57 or make some other use input to select a time at which spectrum allocation information is desired. In the illustrated example, indication arrow 57 is set to time $t_1$, which corresponds to the map display. It will be appreciated that the visual characteristics of the time line may be varied, or a visual representation of time other than a time line may be employed. Regardless of how time is represented, a change in the selected time may alter the map commensurately. For example, FIG. 9 depicts the map of FIG. 8, but with the time line selection shifted to time $t_c$ of FIG. 7. The spectrum blocks for area 52 have now altered to be commensurate with the spectrum allocation at time $t_c$, and the exemplary spectrum allocation for area 54 has shifted as well to depict spectrum allocations for area 54 at time $t_c$. In one embodiment, time may be selected in a static mode by which a user may manually select a specific time along the time line at which to display spectrum allocation. Another embodiment may constitute a dynamic mode in which a time range is selected, and a progression of spectrum allocation is depicted over the time range. The map may alter dynamically as a slide show or movie-type image as time proceeds over the selected time range. The rate of change through time may be controlled and paused by user action.

Figure 10:
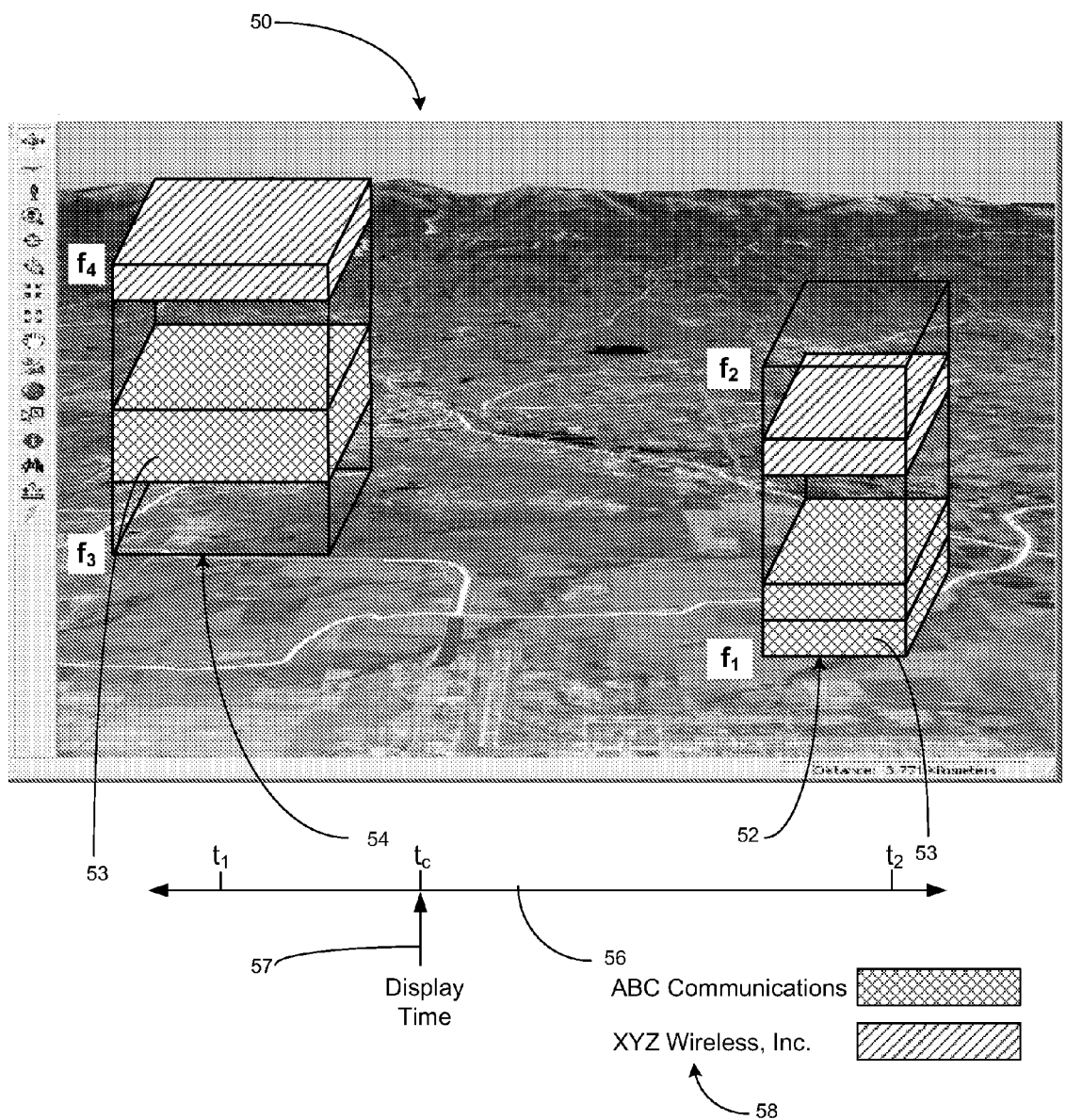
FIG. 10 depicts the map of FIG. 9 in which the spectrum allocation is shown by spectrum holder.

In FIGS. 8 and 9, the spectrum segments are delineated based on frequency. Other delineations may be employed. In particular, FIG. 10 depicts an embodiment in which the spectrum segments may be delineated by spectrum holder. In this embodiment, spectrum segments allocated to a common holder will be patterned the same (and/or shown in a common color) independent of frequency. In this manner, a user may see a display of spectrum allocation information by holder identity. The map may include a legend 58 that indicates the identity of each spectrum holder for a corresponding pattern or color on the spectrum map. In this example, the map indicates that ABC Communications holds two spectrum segments in area 52 and one spectrum segment in area 54. XYZ Wireless, Inc. holds one spectrum segment in area 52 and one spectrum segment in area 54. In addition, other formats may be used to delineate the spectrum segments, such as color coding.

Once a map is displayed, a user may navigate the map to access additional information regarding a particular segment or block of spectrum. For example, a user may employ a cursor, pointer, or any other conventional navigational tool to select a displayed block or blocks of spectrum. Also, the map may be displayed on a touch screen display by which a block or segment of spectrum may be selected with a stylus, finger, or comparable touch-based input device. The display may include additional navigational features that may aid spectrum block selection and/or viewing. Such additional features may include navigational tools including zoom, pan, rotate display, tilt display, elevation navigation, and the like. Once a particular block or segment of spectrum is accessed, a user may obtain additional information regarding that block of spectrum.

Figure 11:
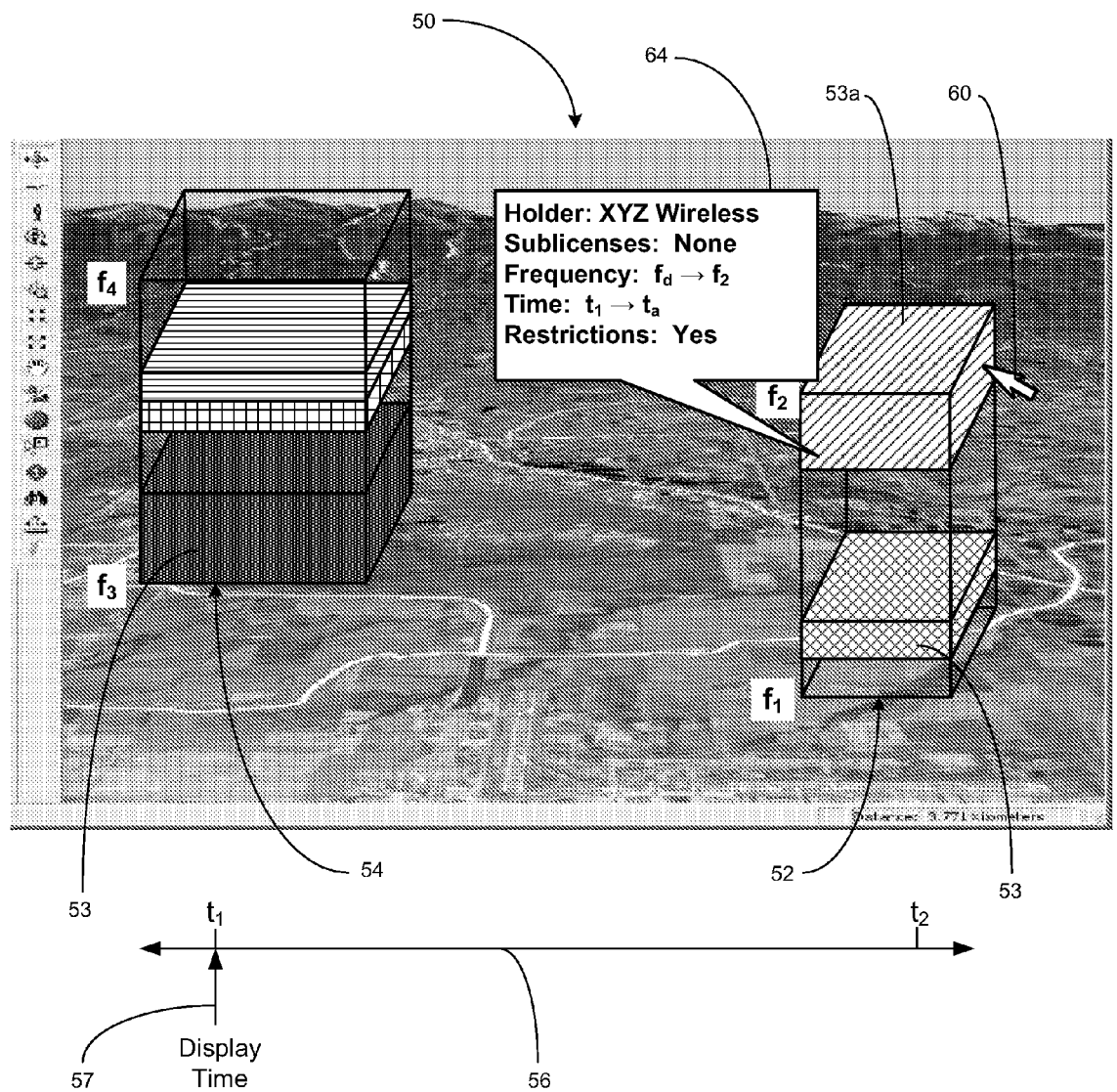
FIG. 11 depicts an exemplary interactive map-based display of spectrum allocation information derived from the map display of FIG. 8.

FIG. 11 depicts an exemplary interactive map-based display of spectrum allocation information derived from the map display of FIG. 8. In this example, a mouse pointer 60 appears on the map which permits a user to navigate the map. The mouse pointer may be used to select a specific spectrum segment in the display. The mouse pointer may also be used to select a specific time by moving the time indication arrow 57 along the time line 56. In this example, a user has moved the mouse pointer to area 52, and specifically to the upper most block 53a of allocated spectrum. A "pop-up" text balloon 64 has appeared on the map display, and the text balloon may include some basic information about this particular block of spectrum. For example, the balloon identifies the FCC license Holder as XYZ Wireless, indicates that there are no known sublicenses, that the frequency spectral mask is $f_d \rightarrow f_2$, and the time window is $t_1 \rightarrow t_a$. If the user were to move the mouse pointer to point to another spectrum segment or block, a new text balloon would appear for that spectrum segment, and so on. As stated above, a mouse pointer is an exemplary navigation tool, but other navigation tools (e.g., a touch screen on which the map is displayed) may be used.

In the current example, the text balloon 64 also contains a "Restrictions" field, which, in this example, contains a "Yes" entry. The "Yes" entry indicates that the spectrum usage is restricted in some manner. For example, usage may be restricted by having a power limit, or be subjected to one or more FCC "service rules". As is known in the art FCC service rules typically are specified under an FCC "Part" number. The service rules under each license may refer to an application and/or the type of radio technology that may use the licensed spectrum. While the service rules are typically commensurate with the user's desired application, the licensed spectrum effectively is limited for a stated purpose, although several types of uses may fall within the purpose as governed by the service rules associated with the license. It will be appreciated that text balloon 64 is an example, and that the specific content and format of the display spectrum information may be varied. For instance, the balloon 64 may list information about restrictions.

In one embodiment, a user may obtain additional details regarding the particular spectrum segment by selecting the text balloon 64 (or comparable representation). The selection may be made by a user with a "mouse click", touch screen tap, or by other conventional means of selecting items from an electronic display. Once the text balloon is selected, more detailed text information may be viewable in addition to or instead of the map such as spectral mask information, duration or time window of a corresponding license or sublicense, geographic boundaries if larger than displayed, etc. Other information may include contact or other corporate information regarding the holder and any sub-licensees, a description of the current usage, details describing any applicable restrictions and FCC service rules, and the like. It will again be appreciated that the content and format of the detailed spectrum information may be varied.

Referring again to FIG. 3, maps, spectrum allocation information, spectrum segment information, and other related information may stored in the electronic device 20, such as in memory 45. Such information also may be transformed or transmitted via the I/O interface 29 to various peripheral I/O devices, such as printers, faxes, external storage devices, and the like. Information may also be transmitted to other electronic devices via the network interface 22 over the communications system 68 (see FIG. 4) by any conventional means.

For a given geographic location at a given time, the number of allocated segments of spectrum may be myriad. If all such spectrum blocks were displayed on a single map, the result may be a cluttered display that is difficult to comprehend and navigate. In one embodiment, therefore, a user may limit the display to a particular frequency range or ranges that may be of more interest to the prospective user (or other searcher). In another embodiment, additional criteria may be imposed to limit the search scope and resultant display. The additional criteria may include holder identity, allocation time window or expiration time, power limits, usage restrictions, applicable FCC service rules, and the like.

FIG. 12 depicts an exemplary user interface constituting a query page 80 for entering search criteria. The query page 80 may be displayed on the display 24 of the electronic device 10. It will be appreciated that FIG. 12 is an example, and the content and format of the query page may be varied. Search criteria may be entered with a keyboard, keypad, selection from a menu, or by other conventional means. As part of this map-based search system, a user may enter a geographic category (e.g., an FCC defined area) for defining the geographic areas of interest. In this example, the user has selected to search by FCC Economic Area boundaries as depicted in FIG. 5. The user also has limited the searched frequency ranges to 6-10 MHz and 2.4-2.6 GHz. The user has also delineated the search by time from a start date and time of Jan. 1, 2009 at 12:00:00 a.m. EST to an end date and time of Dec. 31, 2009 at 11:59:59 EST. In one embodiment, the time delineation may limit results to spectrum segments having any portion within the specified range. Alternatively, the time delineation may limit results to spectrum segments wholly within the specified range, or having some threshold proportion within the specified range. The user also has entered a search limit to service rules under FCC Part 15. Note that other search fields, such as Holder and Power Limit, have been left blank in this example. These fields, therefore, would not operate to narrow this exemplary search.

Once any desirable search criteria have been entered, a user may be presented with a broad initial map, such as a national map of the entire United States, from which a specific geographic area of interest may be selected. For example, if a user has selected to search spectrum allocation information by FCC Economic Area, a map similar to FIG. 5 may provide an initial starting point. A user may then select a specific geographic area of interest, resulting in a map-based display of spectrum allocation information for the selected area, such as that depicted in FIGS. 8-11. The map-based display of the spectrum allocation information may be limited by any search criteria provided on the search query page. A user may then navigate the display of spectrum allocation information in the manner described above. In one embodiment, a user may be presented with regional maps of portions of the United States as intermediaries to selecting the specific geographic area of interest. In another embodiment, a specific geographic area of interest may be entered in the search query page using any appropriate geographic search criteria entry option, and national and/or regional maps may be excluded from the search process.

Figure 13:
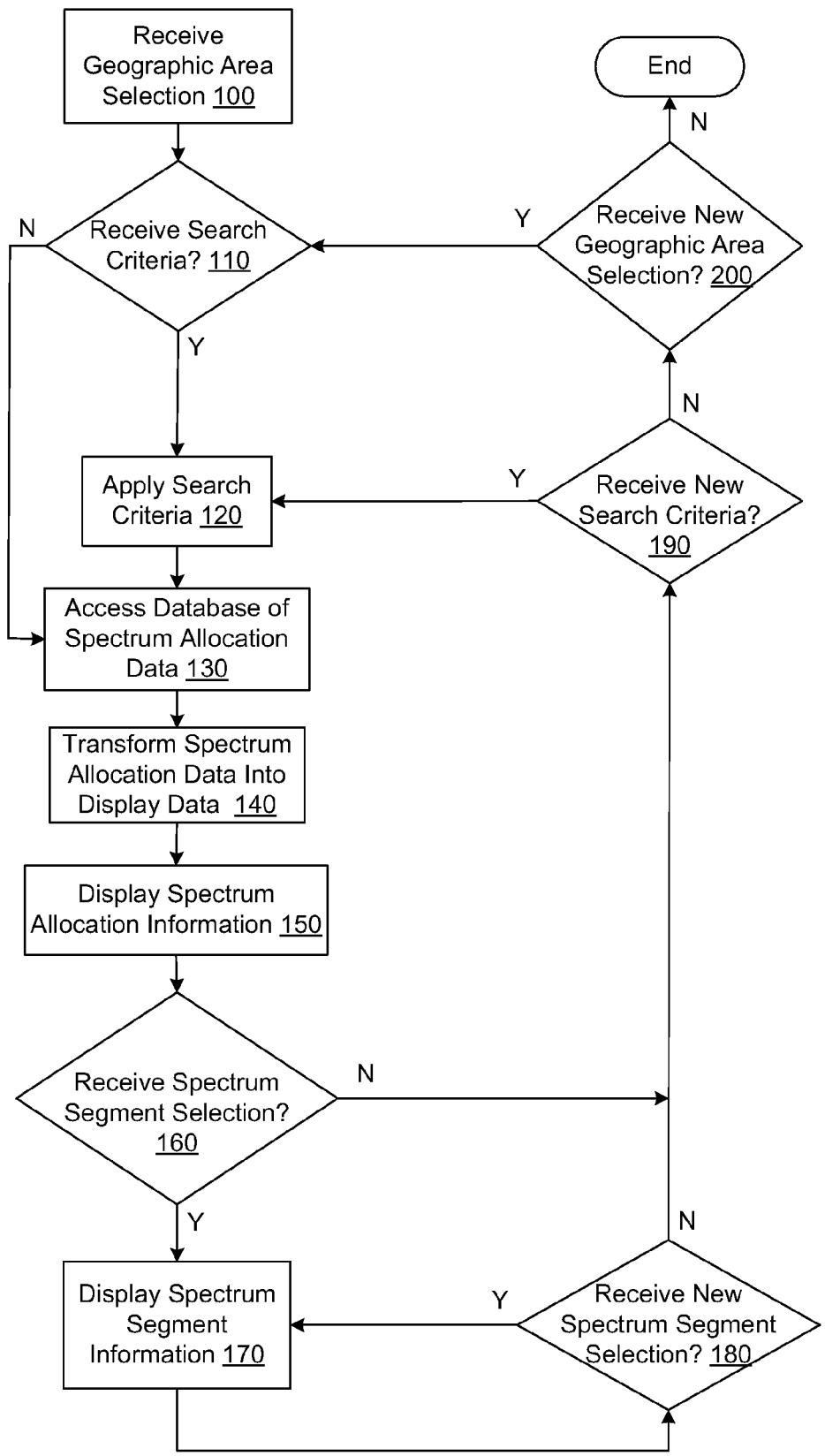
FIG. 13 is a flowchart depicting an exemplary method of providing map-based spectrum allocation information.

In accordance with the above, FIG. 13 is a flowchart depicting an exemplary map-based method of providing spectrum allocation information. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 100, at which an input of a selected geographic area of interest is received. The system initially may default to the current time. At step 110, limiting search criteria may be received, and if so, at step 120 the search criteria may be applied. The search criteria, as stated above, may be one or more of a time or time range, frequency or frequency range, holder identity, restrictions, and others. At step 130, a spectrum allocation database containing spectrum allocation data may be accessed. At step 140, the spectrum allocation data may be transformed into display data, which is displayed at step 150. At step 160, a selection of a specific spectrum segment may be received. If such a selection is received, at step 170 information about the selected spectrum segment may be displayed.

It will be appreciated that the search system may provide for multilevel or sequential searching across numerous geographic areas, spectrum segments, and/or search criteria. Accordingly, for example, at step 180 a selection of a new spectrum segment may be received. The method may return to step 170 to display spectrum allocation information for the newly selected spectrum segment. At step 190, new search criteria may be received, which would then be applied at step 120. At step 200, a new geographic area selection may be received, and the method may return to step 110 so that the same or new search criteria may be selected and applied to the newly selected geographic region.

The above description provides primarily for a geography-based search, in which a user inputs a geographic area to generate the display of an associated spectrum map. In other embodiments, spectrum allocation maps may be generated by the input of other initial parameters. For example, referring again to the exemplary query page of FIG. 12, a user need not enter a geographic category at all. A user may instead search FCC spectrum allocation information by non-geographic parameters, such as holder identification, frequency ranger, and/or other parameters. In such a situation, the search results may yield map-based spectrum allocation for the particular holder identification, frequency range, etc. The map-based search results may then be manipulated in the manners described above.

The disclosed system and methods, therefore, provide map-based searching and display of spectrum allocation information. The information is provided in a user-friendly and interactive format to enhance the obtaining of spectrum allocation information beyond the capabilities of current systems.

Although certain embodiments have been shown and described, it is understood that equivalents and modifications falling within the scope of the appended claims will occur to others who are skilled in the art upon the reading and understanding of this specification.

What is claimed is:

1. A method of displaying spectrum allocation in a map-based format comprising the steps of:
receiving user search criteria for spectrum allocation, the search criteria including a geographic area;
accessing a database of spectrum allocation information; and
transforming spectrum allocation information corresponding to the geographic area from the search criteria into display data for overlaying on a geographic map;
wherein the geographic map has a two dimensional map base representing a geography of the geographic area from the search criteria, and the spectrum allocation information is overlaid on the two dimensional geography map base as stacked spectrum segments of corresponding allocated and non-allocated spectrum in a third elevation dimension relative to the two dimensional geography map base; and
wherein each allocated spectrum segment has a color or pattern representing an entity having rights with respect to the associated spectrum.

2. The method of claim 1, wherein the spectrum segments are segmented according to frequency of corresponding allocated spectrum.

3. The method of claim 2, wherein each spectrum segment has a color or pattern representing a corresponding frequency range.

4. The method of claim 1, wherein the spectrum segments are overlaid on the geography map base for a corresponding point in time.

5. The method of claim 4, wherein the overlaid spectrum segments are revised for a second point in time.

6. The method of claim 1, wherein the spectrum segments are overlaid on the geography map base dynamically over a time range to reflect changes in spectrum allocation over the time range.

7. The method of claim 1, wherein the spectrum segments are overlaid on the geography map as stacks of blocks.

8. The method of claim 1, further comprising the steps of receiving a user input selection of a spectrum segment, and generating display data for the selected spectrum segment, the display data including information selected from spectrum holder information, secondary licensee information, spectral mask data, time window information, use restriction information and combinations thereof.

9. The method of claim 1, wherein the search criteria includes at least one of time, time range, frequency, frequency range, spectrum holder, or usage restrictions.

10. A system for generating a display of spectrum allocation in a map-based format comprising:
an input interface for receiving user search criteria for spectrum allocation, the search criteria including a geographic area; and
a controller configured to access a database of spectrum allocation information and transform spectrum allocation information corresponding to the geographic area from the search criteria into display data for overlaying on a geographic map;
wherein the geographic map has a two dimensional map base representing a geography of the geographic area from the search criteria, and the spectrum allocation information is transformed into display data as stacked spectrum segments of corresponding allocated and non-allocated spectrum in a third elevation dimension relative to the two dimensional geography map base; and
wherein each allocated spectrum segment has a color or pattern representing an entity having rights with respect to the associated spectrum.

11. The system claim 10, wherein the spectrum segments are segmented according to frequency of corresponding allocated spectrum.

12. The system of claim 11, wherein each spectrum segment has a color or pattern representing a corresponding frequency range.

13. The system of claim 10, wherein the spectrum segments are overlaid on the geography map base for a corresponding point in time.

14. The system of claim 13, wherein the overlaid spectrum segments are revised for a second point in time.

15. The system of claim 10, wherein the spectrum segments are overlaid on the geography map base dynamically over a time range to reflect changes in spectrum allocation over the time range.

16. The system of claim 10, wherein the spectrum segments are overlaid on the geography map as stacks of blocks.

17. The system of claim 10, wherein the controller is further configured to receive a user input selection of a spectrum segment, and to generate display data for the selected spectrum segment, the display data including information selected from spectrum holder information, secondary licensee information, spectral mask data, time window information, use restriction information and combinations thereof.

18. The system claim 10, wherein the controller is located in a server device and the geographic map is displayed on a client device.

19. The system of claim 10, wherein the search criteria includes at least one of time, time range, frequency, frequency range, spectrum holder, or usage restrictions.

20. A non-transitory computer readable medium storing a program for displaying spectrum allocation in a map-based format, the program comprising executable logic to:
receive user search criteria for spectrum allocation, the search criteria including a geographic area;
access a database of spectrum allocation information; and
transform spectrum allocation information corresponding to the geographic area from the search criteria into display data for overlaying on a geographic map;
wherein the geographic map has a two dimensional map base representing a geography of the geographic area from the search criteria, and the spectrum allocation information is transformed into display data as stacked spectrum segments of corresponding allocated and non-allocated spectrum in a third elevation dimension relative to the two dimensional geography map base; and
wherein each allocated spectrum segment has a color or pattern representing an entity having rights with respect to the associated spectrum.

21. The non-transitory computer readable medium of claim 20, wherein the spectrum segments are segmented according to frequency of corresponding allocated.

* * * * *